United States Patent
Shafer et al.

(10) Patent No.: US 6,741,343 B2
(45) Date of Patent: May 25, 2004

(54) LEVEL WITH ANGLE AND DISTANCE MEASUREMENT APPARATUS

(75) Inventors: David C. Shafer, Menlo Park, CA (US); Andrew G. Butler, Palo Alto, CA (US); William R. Burnett, Menlo Park, CA (US)

(73) Assignee: Toolz, Ltd., Mountain View, CA (US)

( * ) Notice: Subject to any disclaimer, the term of this patent is extended or adjusted under 35 U.S.C. 154(b) by 0 days.

(21) Appl. No.: 10/219,011

(22) Filed: Aug. 14, 2002

(65) Prior Publication Data

US 2002/0186365 A1 Dec. 12, 2002

Related U.S. Application Data

(63) Continuation of application No. 09/247,750, filed on Feb. 9, 1999, now Pat. No. 6,459,483.
(60) Provisional application No. 60/074,203, filed on Feb. 10, 1998.

(51) Int. Cl.[7] .................................................. G01C 9/02
(52) U.S. Cl. ........................................................ 356/247
(58) Field of Search ........................ 356/247, 3.1, 3.12, 356/4.02–4.07, 4.09–4.11, 5.01–5.13, 5.15, 141.2–141.5, 142–148, 152.1–152.3, 153, 248

(56) References Cited

U.S. PATENT DOCUMENTS

| | | | |
|---|---|---|---|
| 3,813,165 A | 5/1974 | Hines et al. | |
| 4,113,381 A | 9/1978 | Epstein | |
| 4,184,333 A | * 1/1980 | Blaha et al. | 60/420 |
| 4,498,764 A | 2/1985 | Bolkow et al. | |
| 4,752,799 A | 6/1988 | Stauffer | |
| 4,759,623 A | 7/1988 | Meier | |
| 4,986,653 A | 1/1991 | Yokokura et al. | |
| 5,082,364 A | 1/1992 | Russell | |
| 5,105,131 A | * 4/1992 | Schap | 318/282 |
| 5,141,317 A | 8/1992 | Bollhagen et al. | |
| 5,180,922 A | 1/1993 | Hug | |
| 5,294,970 A | 3/1994 | Dornbusch et al. | |
| 5,534,992 A | 7/1996 | Takeshima et al. | |
| 5,748,295 A | 5/1998 | Farmer | |
| 5,774,211 A | * 6/1998 | Ohtomo et al. | 356/141.2 |
| 5,784,155 A | * 7/1998 | Ohtomo et al. | 356/141.1 |
| 5,819,424 A | * 10/1998 | Ohtomo et al. | 33/290 |
| 5,848,485 A | * 12/1998 | Anderson et al. | 37/348 |
| 5,852,413 A | * 12/1998 | Bacchi et al. | 341/13 |
| 5,894,123 A | * 4/1999 | Ohtomo et al. | 250/236 |
| 5,949,531 A | 9/1999 | Ehbets et al. | |
| 6,075,586 A | * 6/2000 | Ohtomo et al. | 356/4.08 |
| 6,459,483 B1 | * 10/2002 | Shafer et al. | 356/247 |

* cited by examiner

Primary Examiner—Michael P. Stafira
(74) Attorney, Agent, or Firm—Vierra Magen Marcus; Harmon & DeNiro LLP

(57) ABSTRACT

A laser leveling system includes an angle measurement device for determining the position of a laser level relative to a base. The system further includes a mechanism for determining the distance from the laser level to a target.

29 Claims, 13 Drawing Sheets

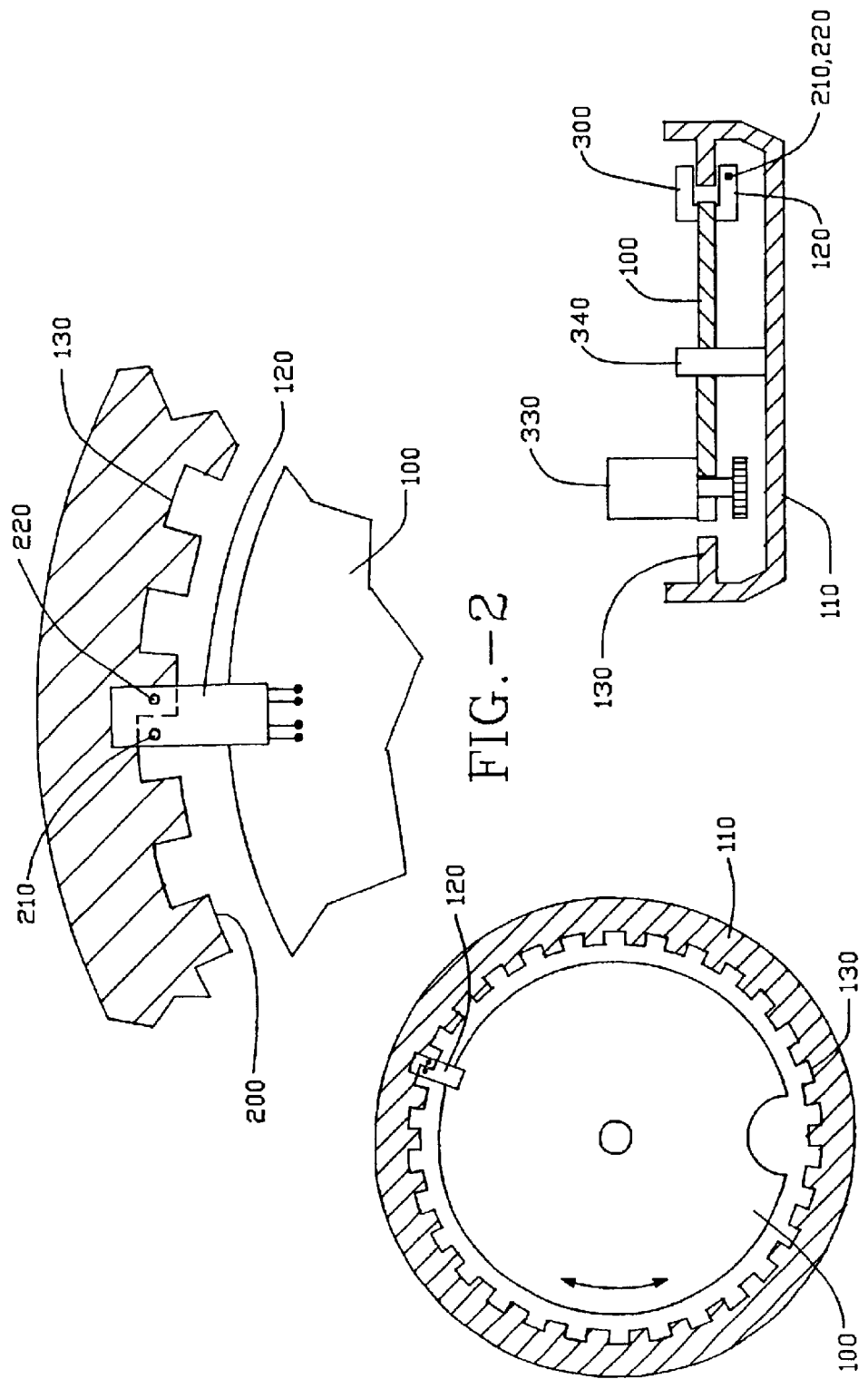

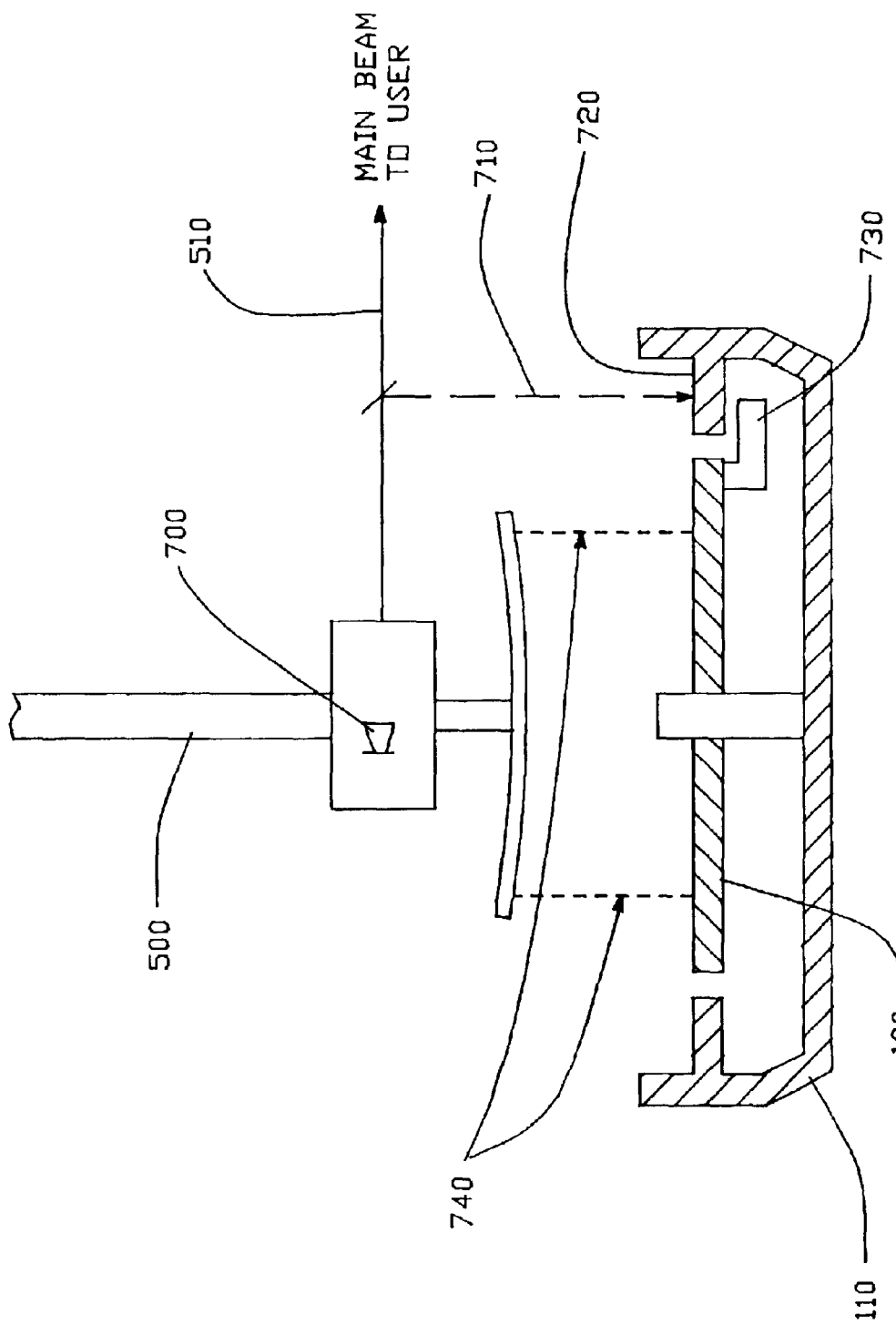

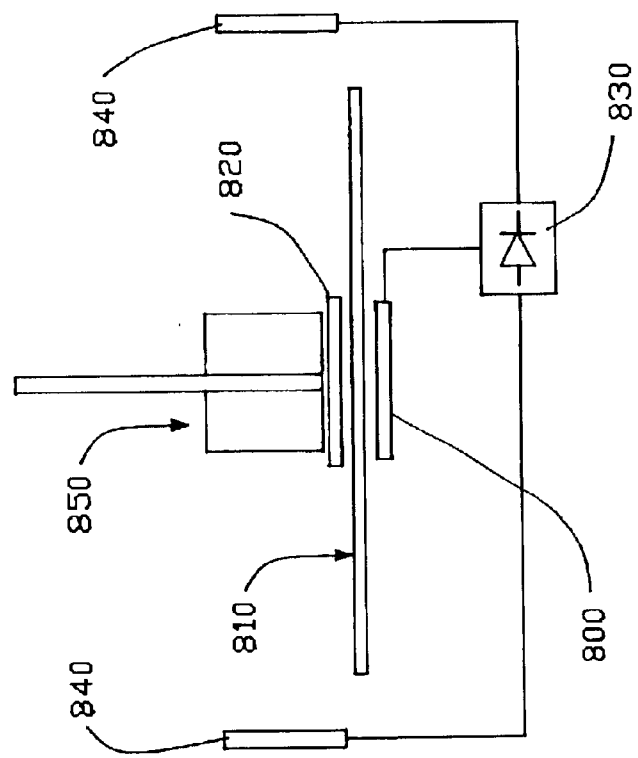
FIG.—8B
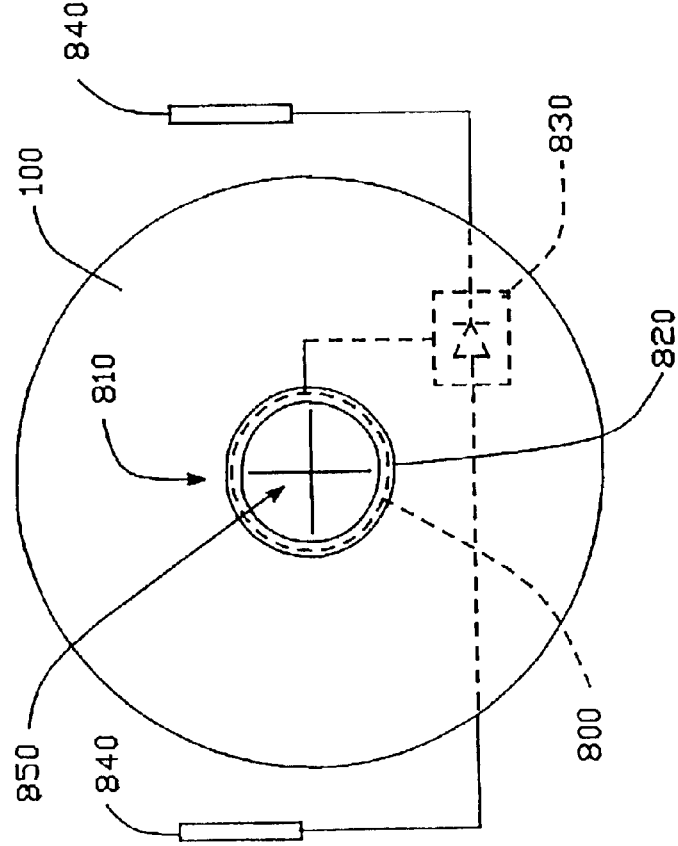
FIG.—8A

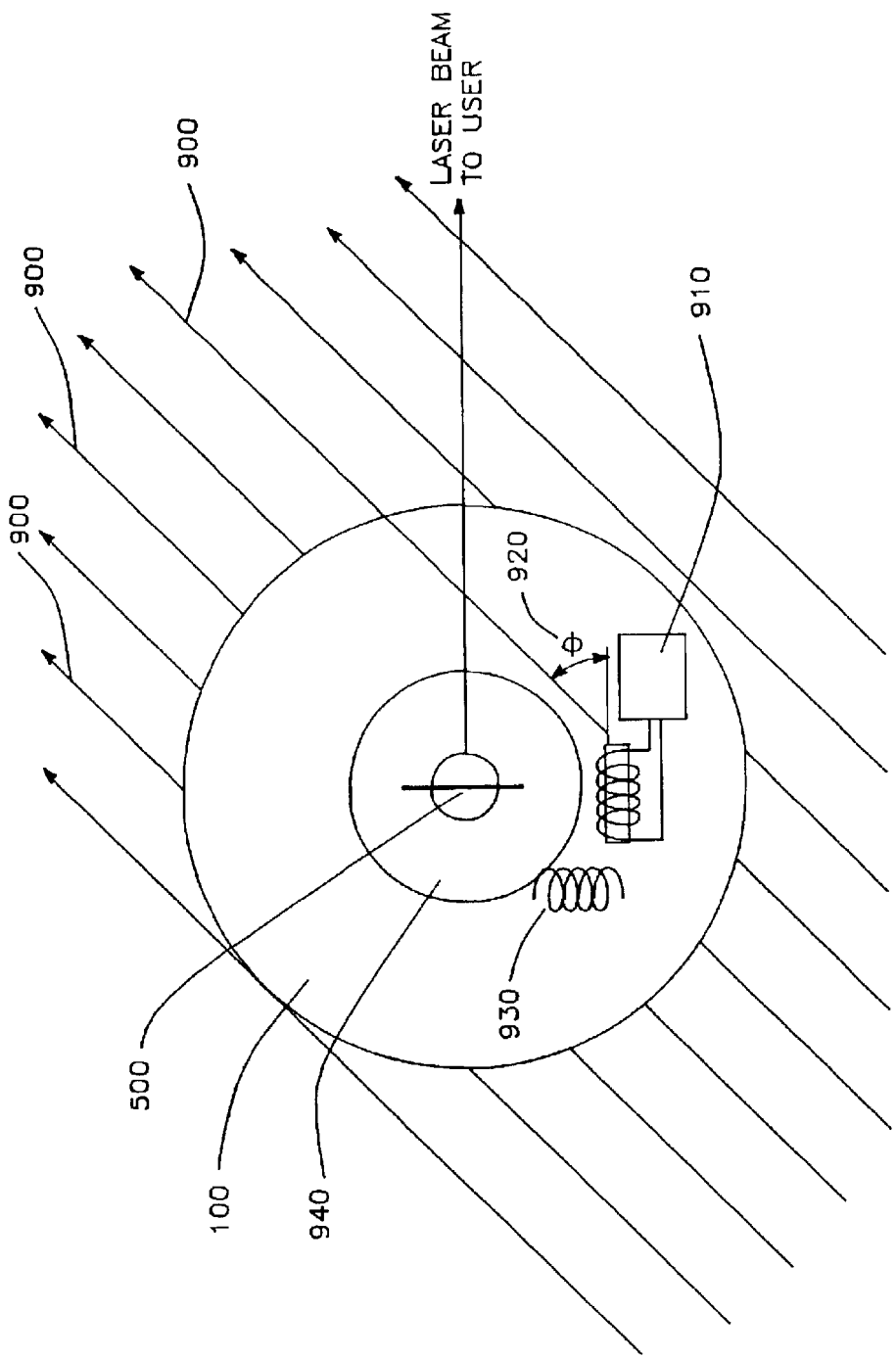
FIG.—9

US 6,741,343 B2

LEVEL WITH ANGLE AND DISTANCE MEASUREMENT APPARATUS

This application claims priority under 35 U.S.C. §120 from, and is a continuation application under the continuing application procedure of 37 C.F.R, §1.53(b)(1) of, U.S. patent application Ser. No. 09/247,750 now U.S. Pat. No. 6,459,483, entitled "Level With Angle and Distance Measurement Apparatus," filed Feb. 9, 1999.

The herein application claims the benefit of U.S. Provisional Application No. 60/074,203, filed Feb. 10, 1998, entitled LEVEL WITH ANGLE AND DISTANCE MEASUREMENT APPARATUS.

Reference is made to U.S. Pat. No. 5,680,208 issued on Oct. 21, 1997, and entitled GRAVITY ORIENTED LASER SCANNER and incorporated herein by reference. Also incorporated herein by reference is U.S. patent application Ser. No. 08/878,782, filed on Jun. 19, 1997, and entitled REMOTELY POSITIONABLE GRAVITY ORIENTED LASER SCANNER. The invention hereof can be applied to the apparatus described in the above patent which is referred to as a laser leveling system or a level and the apparatus in the above application.

BACKGROUND OF THE INVENTION

There are a number of laser leveling devices which are currently in the marketplace. One of such devices is described hereinabove in the above referenced U.S. patent. This device has multiple advantages, however, a number of enhanced features can be added in order to expand the functionality of that device.

SUMMARY OF THE INVENTION

A. Angle Measurement

The following describe an invention relating to angle measurement. Many users of a leveling system such as described in the above patent would like the enhanced ability of the level to measure the angle turned by the base unit during operation. This would ease the layout of things like foundation walls, where the contractor could put a leveling system at one corner and from there lay out two walls of the foundation both level and at the correct angles.

To be most useful in these applications, an angle resolution and accuracy of about 0.1° are desirable, and the readout should be made at the remote unit which can be a remote control or a target if desired. While the above leveling system contains an encoder, it is mounted on the motor shaft, and there can be backlash in the system such that this encoder may not meet the accuracy specification. In addition, the radio link used is one-way only, and cannot be simply modified to allow display of the angle on the remote control. The invention disclosed has two aspects: those relating to the means for measuring the angle turned by the Base unit, and those relating to display of the angle information on the Remote control unit.

B. Distance Measurement

The following describe an invention relating to range measurement. Many users of a leveling system such as described in the above patent would like the enhanced ability of the level to measure the distance from the Base to the spot from which the beam reflects (either a wall, stud, or the Remote unit itself). In addition to the distance-measurement apparatus disclosed below, the method of transmitting data from the Base (where the distance measurement is actually made) to the Remote (where the data is needed) can use modulation of the laser beam, as disclosed with angle measurement. For the intended application, a distance resolution and accuracy of about 0.2 inches is desirable, independent of distance over the range form 8 to 100 feet.

Additional features, objects and advantages of the invention can be obtained from a review of the detailed description of the preferred embodiment, the claims, and the figures.

BRIEF DESCRIPTION OF THE FIGURES

FIG. 1 is a schematic view of an embodiment of an incremental encoder of the invention mounted on the base housing;

FIG. 2 is an enlarged schematic view of teeth and an Encoder LED and Photodiode pairs of the schematic view of FIG. 1;

FIG. 3 is a schematic side view of the incremental encoder embodiment of the invention;

FIG. 7 is a schematic representation of a laser being used to illuminate an encoder;

FIG. 8A is a schematic representation of a magnetic encoder;

FIG. 8B is a schematic side view of the magnetic encoder;

FIG. 9 is a schematic representation of a magnetic compass encoder;

DETAILED DESCRIPTION OF THE PREFERRED EMBODIMENT

I. Angle Measurement

Figure 4:
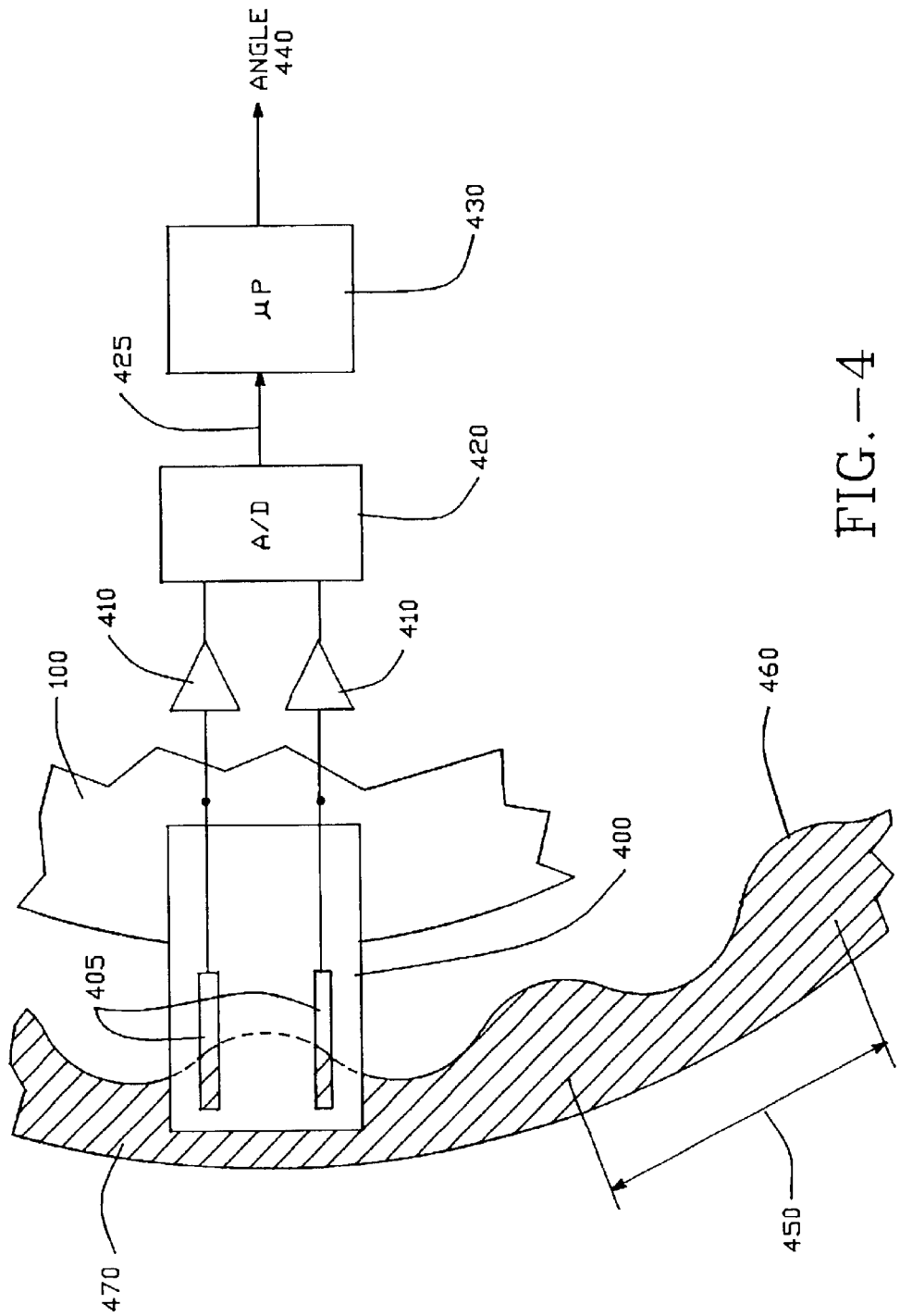
FIG. 4 is a schematic of a microstepped position encoder.

1. Incremental Encoder on Base Housing (See FIGS. 1–3):

One embodiment of a laser leveling system of the present invention is illustrated in FIG. 1. As seen in FIG. 1, a base circuit board (PCB, PCB base, or base) 100 turns inside a base housing (or base unit) 110, a transmissive optical encoder 120 (LED and photodiode pairs, for example) is mounted on the edge of the PCB base 100, and a toothed ring 130 is on the base housing 110. Referring to FIG. 2, it is seen that teeth 200 of the toothed ring 130 project into a path of the encoder 120.

Referring to FIG. 3, the path of the encoder 120 is better illustrated as between LED 300 and photodiode pair 210 and 220. FIG. 3 also illustrates a motor 330 that turns the PCB base 100 on a spindle 340.

The two detector paths differ in phase by 90° of the tooth spacing (i.e., difference in position by a quarter of a tooth spacing), so together the detector outputs (from photo diode pair 210, 220, for example) can be used to determine both position increment and direction, which is essential at slow speed where the dithering used to smooth the motor motion may vibrate the unit slightly. An encoder design which uses both paths can keep track of the dithering, and report only the integrated angle to the user.

2. Microstepped Position Encoder (See FIG. 4):

An elaboration of the above invention is to use a microstepped encoder readout. Referring to FIG. 4, this also uses two encoder channels (400, for example) separated in space by 90° relative to a period of the toothed ring 130 or encoder disk, 470, as illustrated in each of FIGS. 1, 2, and 4, for example), but instead of comparing their outputs to a threshold and counting the resulting "ticks," this design converts them from analog voltages to digital form (425, for example), and processes them to give a position estimate with significantly more resolution than an entire encoder step (450, for example).

One way this can be done, as illustrated in FIG. 4, is to cut the encoder teeth in a sine-wave pattern 460, and make an opto-interrupter aperture 405 of the encoder channels from elongated slits or slots, responsive to integrated light passing through the apertures. As illustrated in FIG. 4, outputs from the encoder channels 400 are provided to electronics, including amplifiers 410, A/D converter 420, and microprocessor 430 for performing the above described computations, resulting in the determination of an angle 440 that the PCB base 100 is rotated.

The light passing through one aperture is proportional to the sine of the position (position angle divided by the angle subtended by each encoder tooth), and the light passing through the other aperture is proportional to the cosine of that position. The position angle relative to one encoder tooth is then recovered unambiguously by taking the four-quadrant arctangent of the digitized signal from the two apertures.

There are many alternative ways to implement this which result in simpler computation for the same resolution. For example, the teeth can be cut in a sawtooth pattern, rather than a sine wave, and the subtooth resolution is given by a linear interpolation and logic, instead of an arctangent computation.

In practice, there are offset and gain errors on each of the aperture signals, which are a function of both the overall shaft angle (e.g., misalignment of the board to the centerline of the encoder wheel), and the speed of movement (e.g., rolloff in the sensing amplifiers). Since the sub-tooth position is resolved digitally, and the processor has an independent measurement of the motion speed, calibration data stored at the time of manufacture can be easily used to increase the resolution of this type of encoder. The result is that far fewer encoder teeth are required for a given angle resolution than with an encoder which simply counts tooth edges. For 0.1° resolution, 900 teeth are needed for the edge-only measurement, while only 100 complete encoder wave cycles are needed for a system which can resolve each tooth to 10°. Over a 4" diameter wheel, the edge-only measurement requires encoder teeth spaced 0.014" apart, while the sub-tooth encoder increases this to a much more reasonable 0.125".

Figure 5:
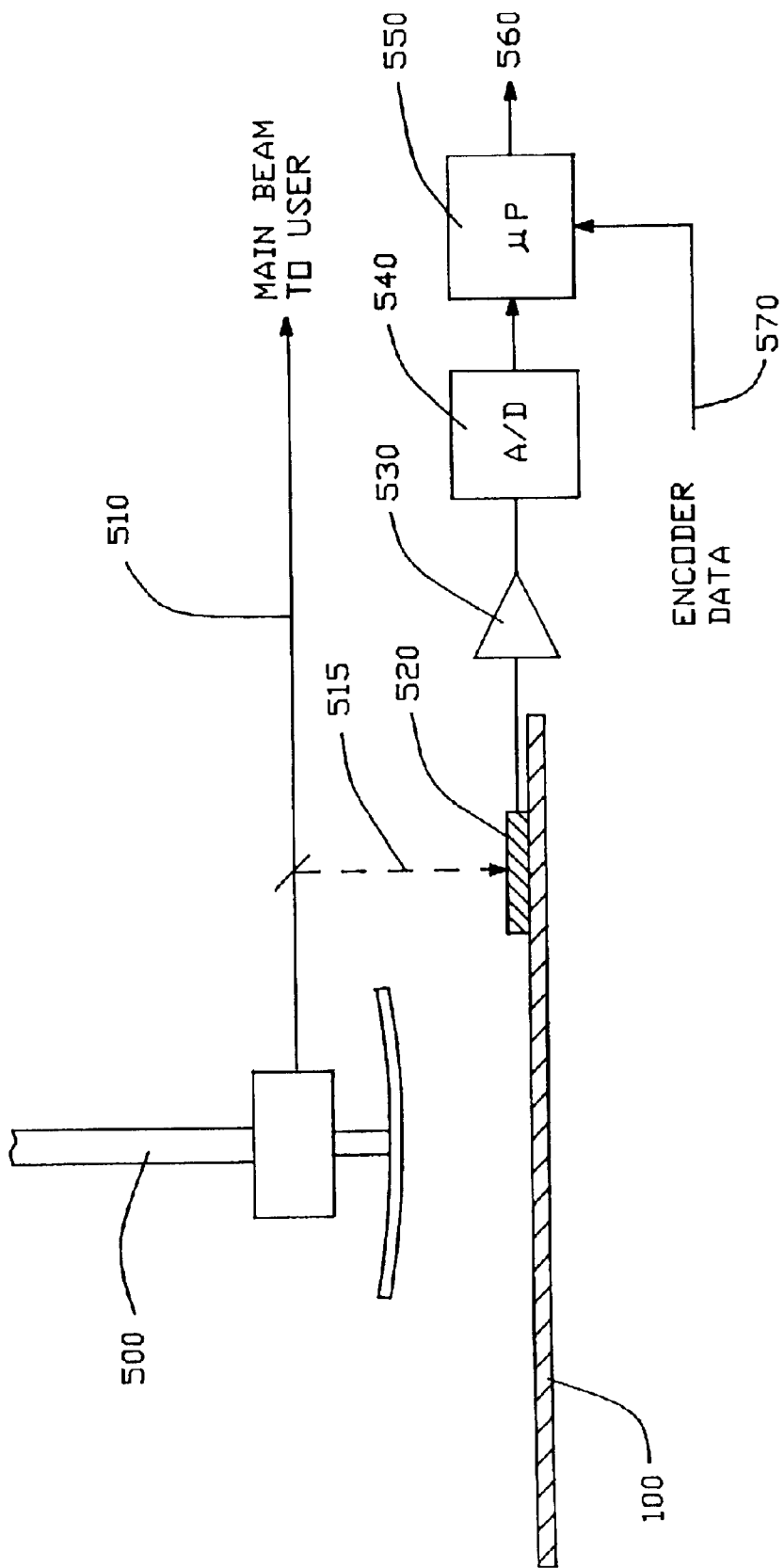
FIG. 5 is a schematic representation of a encoder for a pendulum position.

3. Encoders for Pendulum Position (See FIG. 5):

A drawback to any encoder which measures the position of the leveling system PCB relative to the Base housing is that the user will actually use a laser beam axis as the output marker, not the position of the PCB. FIG. 5 illustrates a laser beam 510 (emitted from a source mounted on pendulum 500) that must be free in order to self-level. However, there may be an azimuthal error between the PCB position and the exit angle of the laser beam, which would degrade the angle measurement accuracy.

One means for correcting this is to divert a small part of the laser beam 515 onto a silicon resistive photosensor 520 (x–y photosensor, for example) mounted on the PCB 100. As illustrated in FIG. 5, output from the photosensor 520 is integrated or amplified by electronics 530, converted to digital form via A/D 540, and provided to microprocessor 550 to compute a corrected angle 560.

Since the position variation between the laser beam and the main PCB is fairly small, the sensor area need not be large. The sensor gives the azimuthal error, which is added to the main encoder angle (encoder data, 570) to give the total angle readout (corrected angle 560). A side benefit of this is that a sensor sensitive to both X and Y position, also gives the fore-aft tilt of the Base.

Figure 6:
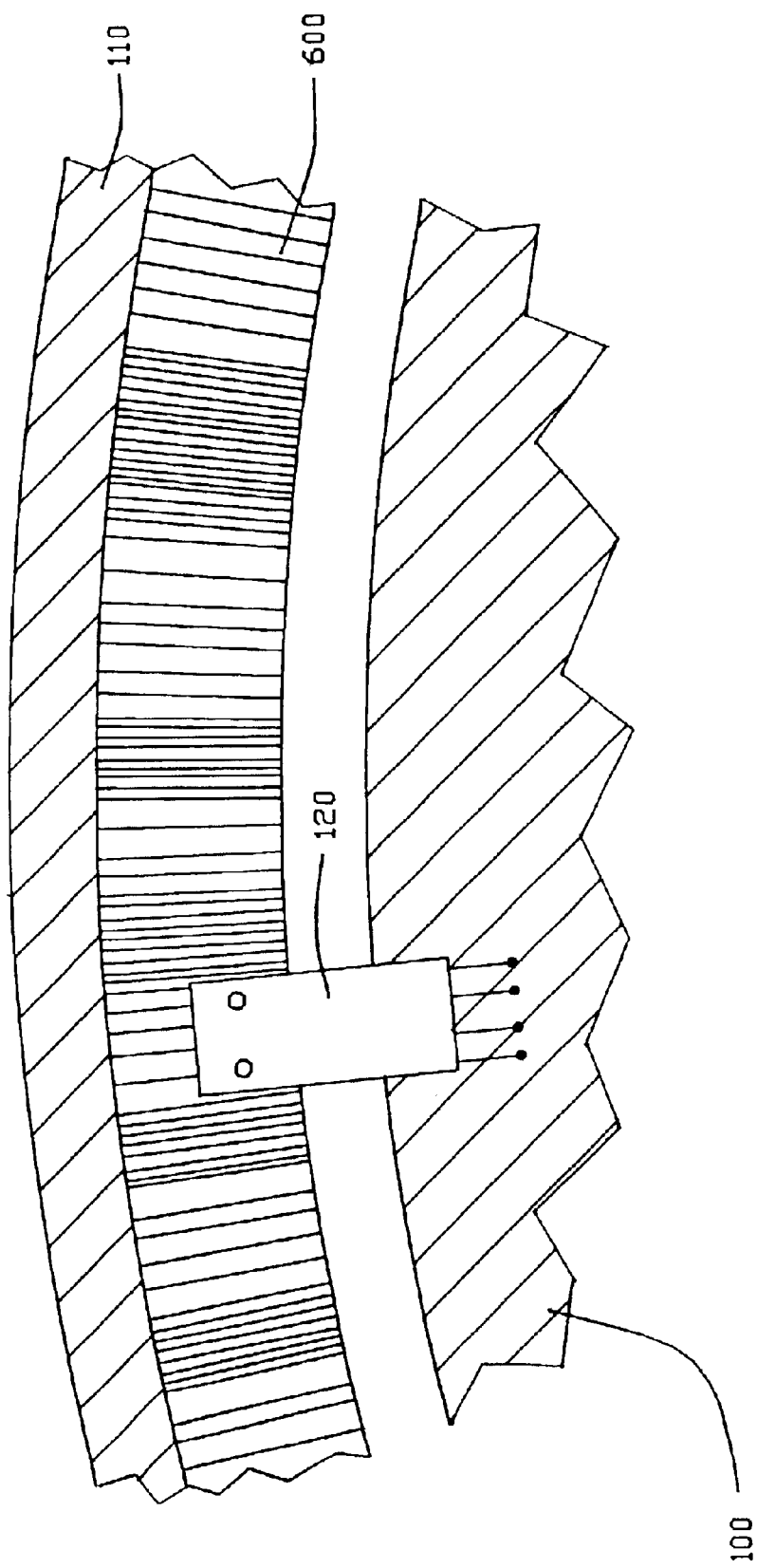
FIG. 6 is a schematic of an encoder which uses light in order to determine the position.

4. Use of Absorptive Encoder (See FIG. 6):

Instead of precisely cutting encoder teeth which block the light, one can use a uniform encoder ring 600 containing a film which absorbs a variable amount of the light passing through it. The sine- or sawtooth-wave pattern exists in the density of the film, rather than in the shape of its edge. Such a film could be produced by photographic techniques, for example.

5. Use of Laser Beam as Encoder Illumination (See FIG. 7):

The functions of the main encoder and pendulum position encoder can be combined by diverting part of the laser beam to use as illumination for the main encoder.

This way, differences between the laser beam position and the base PCB position are greatly reduced, because the diverted beam is accurately vertical and can be collimated to define the sensing aperture.

One variation on this design uses a retro-reflective encoder whose teeth or encoder disk 720 (as illustrated in FIG. 7, for example) reflect the diverted beam 515 back into it's source (laser diode 700, for example), creating an illuminated beam 710. When on a tooth, the increased reflected power causes the laser diode's integrated photo-detector to output an increased current; in effect, the coupling between the laser and the photodiode is increased. The laser driver's automatic power correction (APC) circuit senses this increase in reflected power. The APC circuit is a standard component of a laser diode driver circuit. The bandwidth of the APC circuit is increased to follow the encoder teeth at the fastest speed, which are observed and counted by monitoring the laser diode drive current. FIG. 7 also illustrates detectors 730 for detecting amounts of the diverted laser beam not reflected by encoder disk 720, and dotted lines 740 representing that PCB base 100 and pendulum 500 rotate together.

6. AC Magnetic Encoder in Base (See FIGS. 8A and 8B):

As illustrated in FIGS. 8A and 8B, a non-optical design for measuring the Base rotation uses an induction (or energizing) coil 800 embedded in the base unit, with a drive/sense coil 810 on the PCB base 100. A drive coil 820 on the PCB is energized with a sine wave at a suitable low frequency (such as 9 kHz), which couples to the induction coil 800 in the base unit. A diode circuit 830 produces harmonics of the energizing frequency (frequency doubling, for example), which energize poles of field (hoop) coils 840 at opposite sides of the base unit. The field coils 840 set up a magnetic field. Sense coils 850 are mounted on the PCB base 100 are fixed at right angles, and measure the relative amplitudes and phases of the signals in the two sense coils

850. The phase relationship between the sense coils 850 and the drive coil 820 determine a quadrant, and the ratio of the amplitudes in the two sense coils 850 determines the angular position within the quadrant. One sense coil measures the sine and the other sense coil measures the cosine of the angular position of the Base. The processing is similar to that described above for the microstepped encoder, except that the resolved angle is absolute (i.e., the exact position is known), and not modulo the number of encoder teeth. This measurement need not track the motion of the Base, and so can be done in a narrow bandwidth to attain the high signal-to-noise ratio needed for resolution to 0.1°.

7. Magnetic Compass (See FIG. 9):

A variation of the magnetic encoder described above uses a fluxgate magnetometer or a Hall-effect sensor to measure the horizontal component of the Earth's magnetic field. Unlike all of the above designs, this is a truly absolute measurement, and works properly even if the Base is picked up and rotated.

As illustrated in FIG. 9, an amount of flux from a horizontal component of the earth's magnetic field 900 will affect a fluxgate magnetometer 910. As illustrated by the angle between 900 and fluxgate magnetometer, the amount of flux affecting the fluxgate magnetometer 910 varies with the sine of the base angle 920, and an angle may be measured. A second flux sensor 930 is mounted at 90 degrees, providing a second reading, which provides a second reading that varies with the cosine of 920. Also illustrated in FIG. 9 is a pendulum damper 940. It is noted that the magnetic compass as illustrated in FIG. 9 is mounted on the base PCB 100, but could alternatively be mounted on the pendulum 500.

8. Modulation of Laser to Display Data on Remote (See FIG. 10):

A desire of the existing laser leveling system Remote control for use with an angle-measurement system is the enhanced ability of the Base to send information to the Remote for display to the user. While this may be accomplished by switching to a higher RF frequency which permits two-way RF communication between the Base and Remote, this has penalties in cost, battery life, and size of the Remote antenna. A device for accomplishing this feature is to keep the existing RF transmission for the Remote-to-Base commands, while sending data the other way by modulating the laser beam itself. The Remote 1000 (which can be a remote control unit with a target and/or a target, either of which is held at the remote location or along a line from the Base unit to the remote location) contains a photodetector 1010 and demodulator 1020, and displays the data (via microprocessor 1030 and display 1040) from the Base when the Remote is inserted in the beam.

The fact that the Remote's detector must be in the beam to receive data is actually attractive here, since both angle and distance measurements are made using the laser beam, and this operation indicates to the user the exact point of the measurement.

Figure 10:
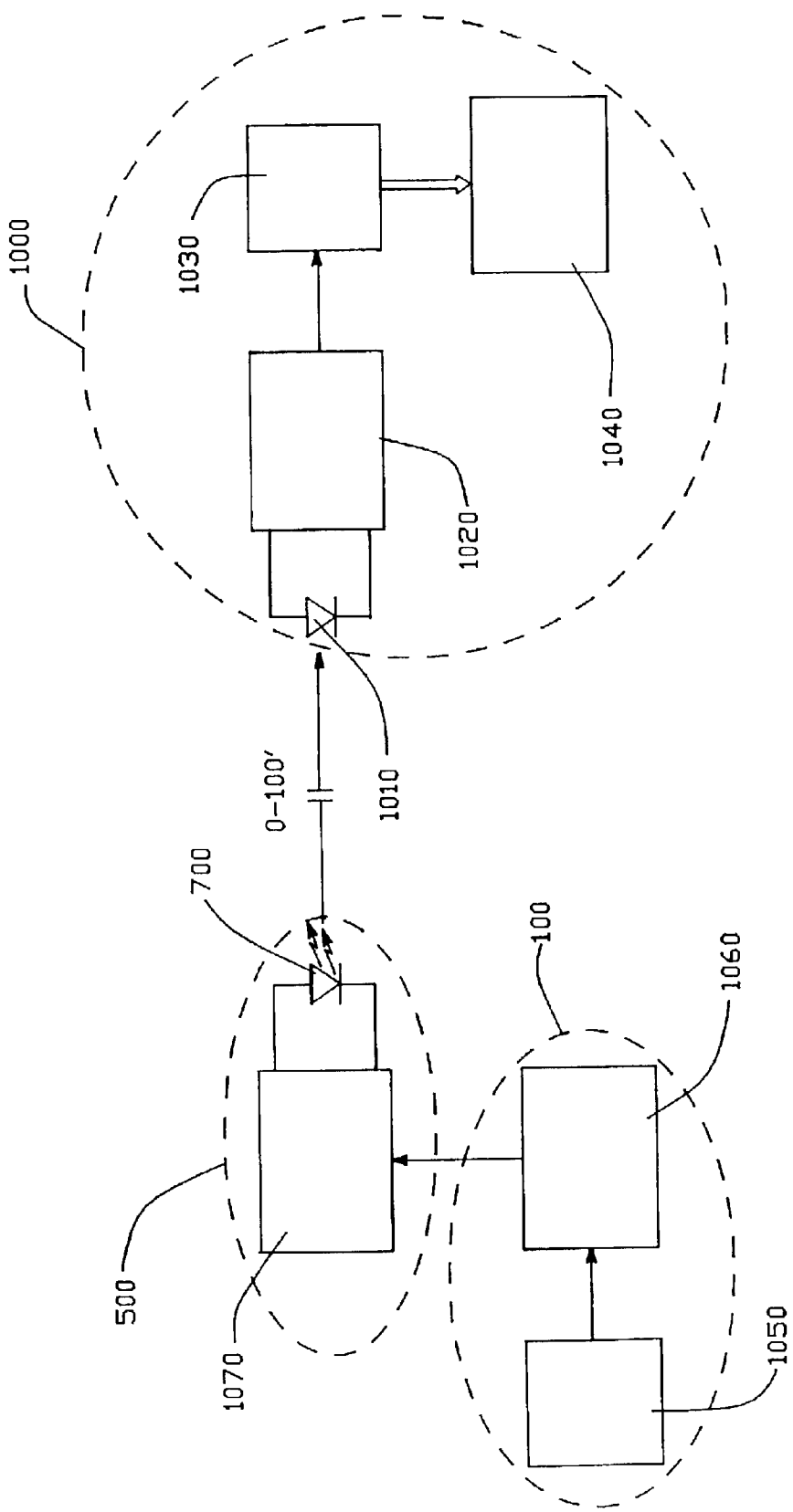
FIG. 10 is a schematic representation of a device which modulates the laser beam in order to transmit data to a remote location.

FIG. 10 also illustrates energization of the laser diode 700, including a laser microprocessor 1050 coupled to a modulator 1060 for modulating a laser driver APC circuit 1070 that drives the laser diode 700. As illustrated in this embodiment, the laser driver APC circuit is mounted on the pendulum 500 and the laser microprocessor 1050 and modulator 1060 are mounted on the PCB base 100.

II. Distance Measurement

The first two sections of this disclosure describe two system approaches to making this measurement, while the remaining two sections detail ways of modulating a low-cost laser diode to obtain range information to the target.

1. Laser Rangefinder to Retro-Reflective (Passive) Target (See FIG. 11):

This system modulates a visible laser diode 1100, and determines a distance 1110 to a retroreflector 1120 on the Remote target (which can be a remote control unit with a reflective target and/or just a reflective target) by the phase or frequency modulation on the return signal 1130 as detected by a PIN photodiode (photodetector) 1140 or similar fast light detector:

In the above illustration, both the transmitter and receiver (laser diode 1100, and PIN photodivide 1140, for example) are located on the pendulum, and are collimated to parallel beams by separate optical elements (focus lenses 1150 and 1160, for example). The photo detector 1140, since it is not a coherent source like the laser diode 1100, will have a wider field of view, so even though the two paths are separated by some distance 1170, the reflected beam (return signal 1130) will be within the detector's field of view beyond some minimum distance from the Base. For example, to meet a minimum measurement distance of 5 feet, with a 1" separation between the laser and detector optics, the detector optics are designed to provide a 2° full-width divergence, and the reflected laser light is visible at the detector for any distance beyond 5 feet.

The split optical system allows isolation between the transmit and receive paths. While signal processing of the detected signal can mitigate some direct-path interference, greater isolation increases the available signal-to-noise ratio, and serves to increase the maximum distance at which the measurement accuracy can be maintained. Although the sketch above shows the transmit and receive paths disposed vertically, this is not a requirement of the method. Accordingly, horizontal separation is within the spirit of the invention.

Figure 11:
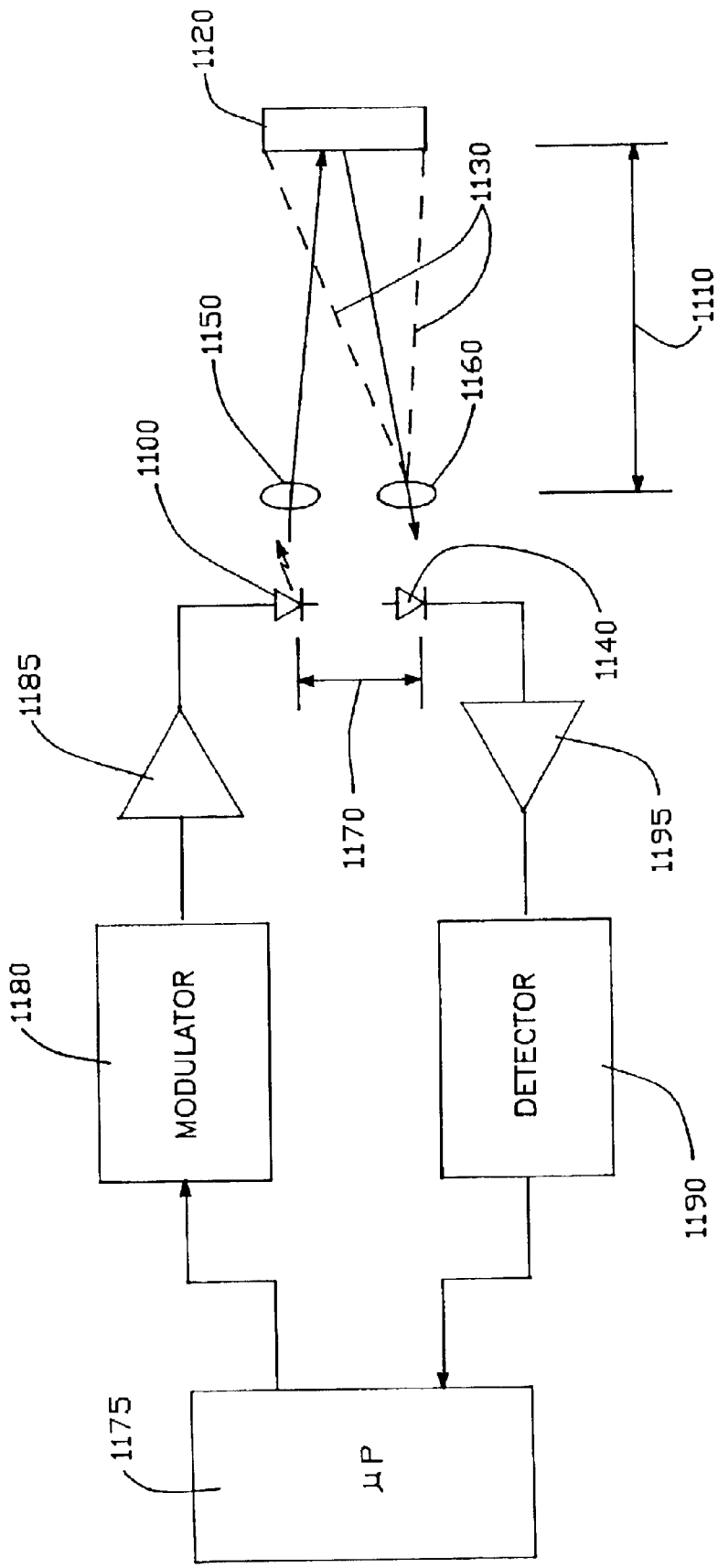
FIG. 11 is a schematic representation of a laser range finder which measures a distance to a target.

As illustrated in FIG. 11, the laser diode is operated by microprocessor 1175 coupled to modulator 1180 coupled to an amplifier 1185 which drives the laser diode 1100. Signals received by the photo detector 1140 are amplified by amplifier 1195 and input to a detector 1190 which provide input to the microprocessor 1175.

2. Laser Rangefinder to IR (Active) Transponder (See FIG. 12):

A variation of the above system design includes the use of an optical transponder 1200 in the Remote target (i.e., remote control and active target unit and/or just active target unit separate from the remote control unit). This transponder 1200 detects the modulated visible laser light 1210, and re-transmits the modulation on an IR 1220 carrier back toward the Base.

The main advantages of this system over the retro-reflective system include the discrimination at the Base (in this embodiment collectively referring to each of the components for detecting the IR carrier 1220) of the desired reflection from clutter, and the larger returned signal power. The discrimination is much greater than the retro-reflective approach because the Base detects the received signal (IR carrier 1220) using the IR (invisible) carrier rather than the reflection of the visible carrier. Thus, reflections from partial beam obstructions or scattering, either inside the Base or partway to the Remote, are not detected. The higher signal power results because the Remote can transmit a much higher carrier power from the IR transmitter than it receives at the maximum distance from the Base. This increases the signal-to-noise ratio at the Base for large distances 1230.

The considerations of this system include the cost, size, weight, and battery drain associated with the transponder, and accounting for any errors introduced in the detector 1260, PLL 1265, and modulator 1270 of the transponder which are not present in a retro-reflective system. Also, another consideration is the field of view 1240 illuminated by the IR emitter 1250 relative to the allowable angles at which the Remote may be held when measuring distance.

Figure 12:
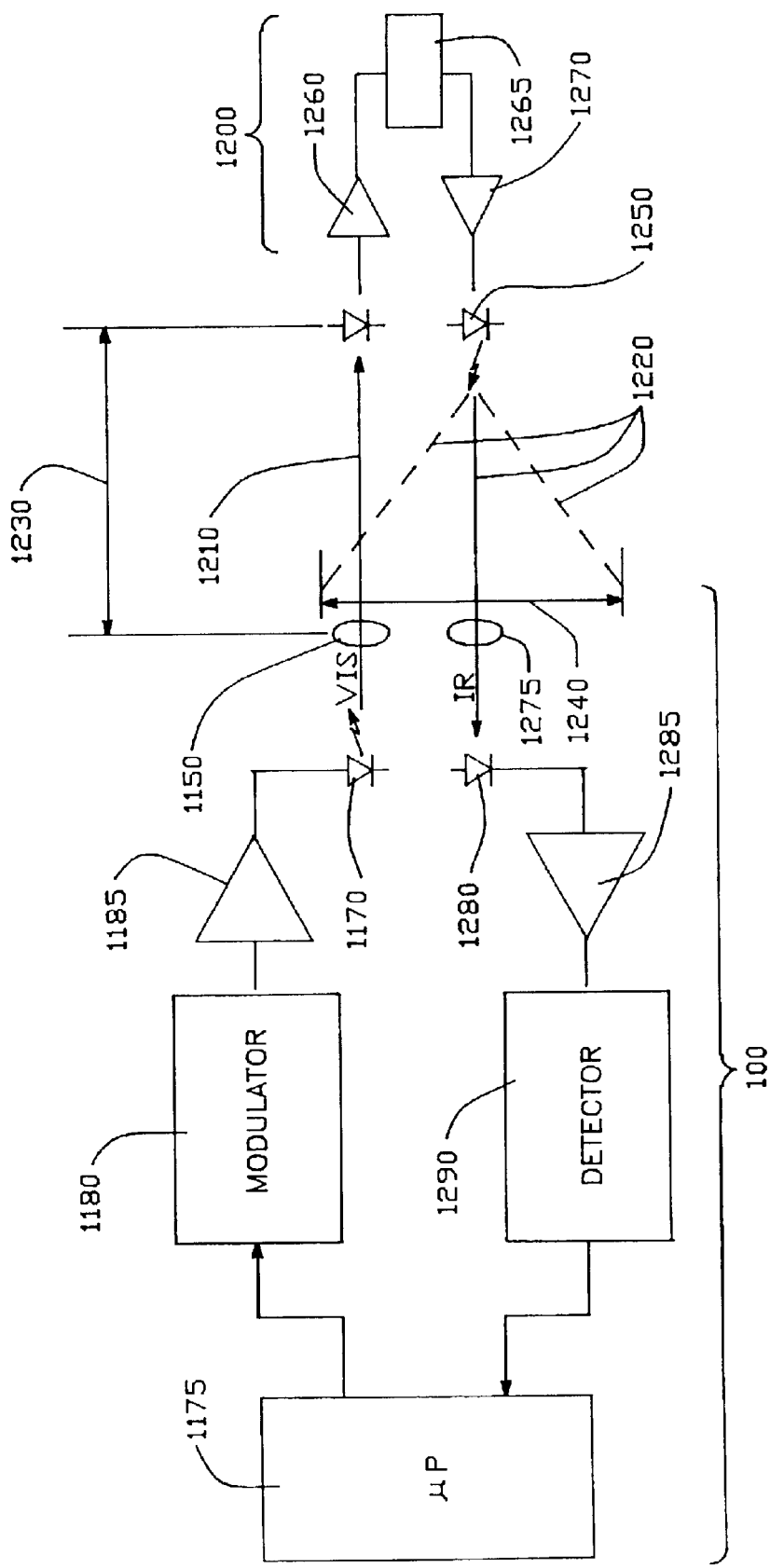
FIG. 12 is a schematic representation of a laser range finder using an IR transponder.

FIG. 12 illustrates the hardware associated with the laser light and IR carrier reception configured similarly to that for the retro-reflective system of FIG. 11, with the inclusion of appropriate IR receiving equipment (including, IR focus lens 1275, IR receptor 1280, amplifier 1285, and detector 1290) are configured to provide appropriate signals to microprocessor 1175.

Figure 13:
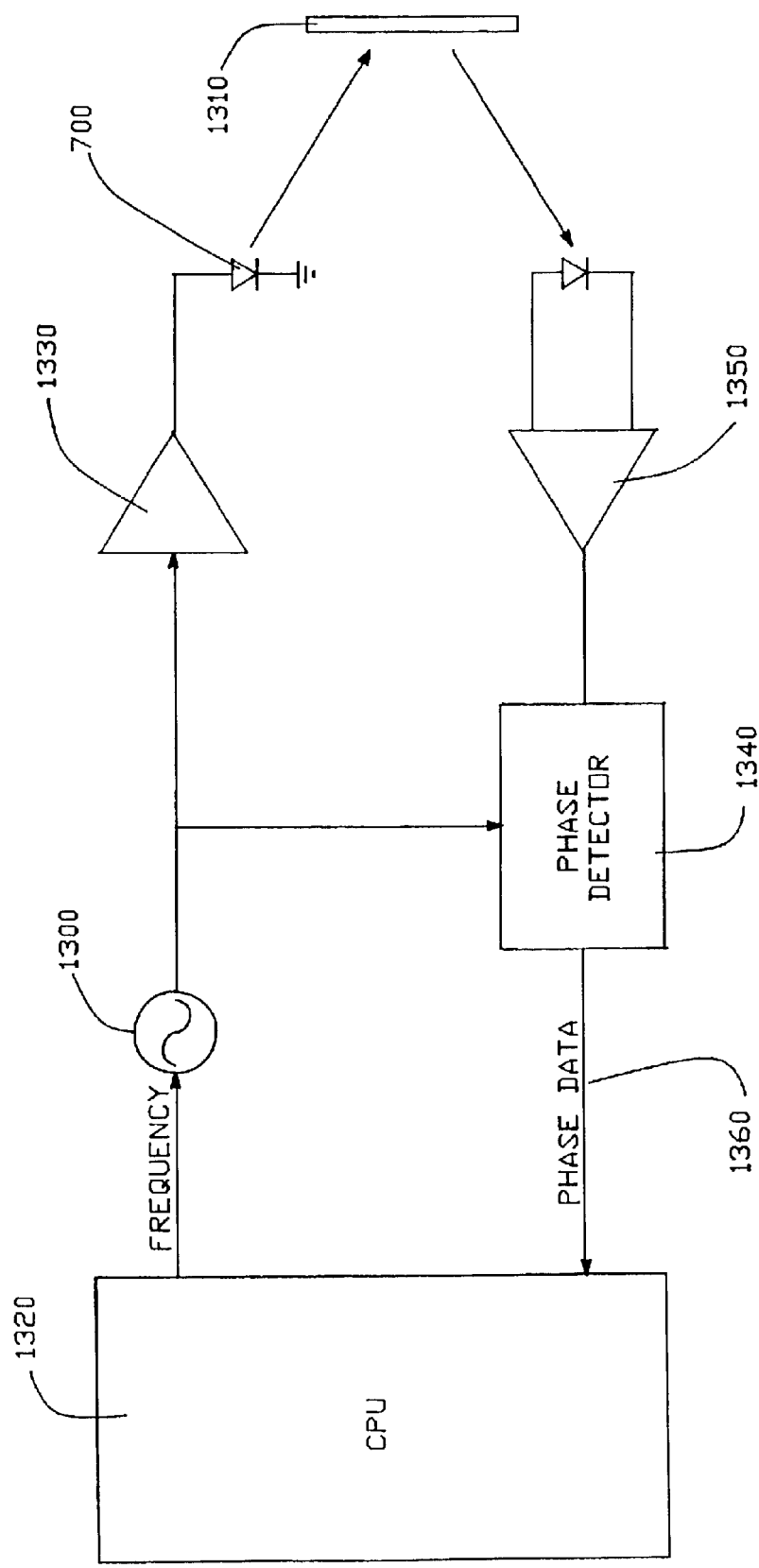
FIG. 13 is a schematic representation of a step frequency laser range finder.

3. Step-Frequency Laser Rangefinder (See FIG. 13):

The step-frequency rangefinder modulates the laser diode 700 with a constant modulating frequency as directed by CPU 1320 and provided by frequency source 1300 for each measurement period. The frequency is stepped in successive measurement periods. At each frequency, a difference in phase between the transmitted and received signals is measured, and the readings from the entire set of frequencies are combined to determine the distance to a reflector 1310 with the desired resolution and without distance ambiguity. FIG. 13 is a diagram of the system.

In each measurement cycle, the CPU 1320 controls the oscillator frequency through a series of steps. The modulation frequency 1300 is applied to the laser driver 1330 to amplitude-modulate the laser diode 700, and is also presented to the phase detector 1340. The other input to the phase detector comes from the receiving photodiode amplifier 1350, so the phase detector output 1360 represents the phase shift undergone by the laser beam's modulation as the beam reflects from the target. In the case where a transponder is used, the system is similar, except that the photodiode receives at the IR transponder wavelength, rather than the laser's visible wavelength.

The lowest modulation frequency is set by the maximum unambiguous range needed. For example, a 100 foot range implies a 200 foot round-trip distance, which requires the slowest modulating frequency to be less than 5 MHz (wavelength is about 200 feet). At this frequency, a close-in target reflects at nearly zero phase shift, while a target at nearly 100 feet again approaches zero phase shift, with no other zeros of the phase in between. However, at only 5 MHz modulation frequency, phase detection accuracy of 0.5° corresponds to a distance of 3.3", which is much too coarse.

To refine the range estimate produced in the first step, the CPU increases the modulation frequency in steps until the phase measurement accuracy corresponds to the needed resolution. For example, with 0.5° phase detection error, the range resolution spec of 0.1" is attained with a modulation frequency of 83 MHz, which is a good match for available laser diodes.

Thus, with a signal of 5 MHz, an approximate distance over about a range of 100 feet is identified. The frequency steps of 10 MHz, 20 MHz, 40 MHz, and 83 MHz then are used to refine with greater accuracy the exact distance measurement.

Figure 14:
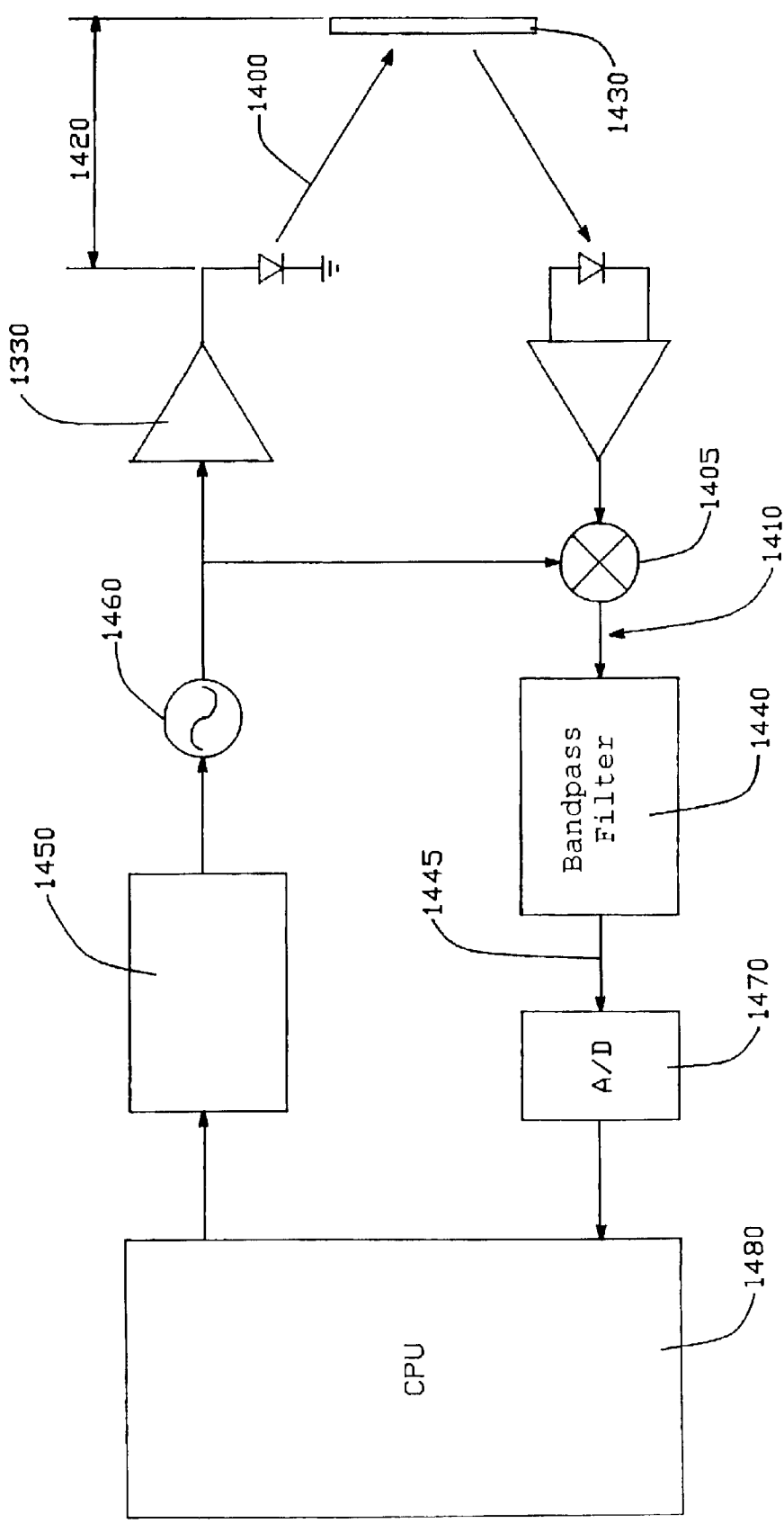
FIG. 14 is a schematic representation of a swept-frequency laser range finder.

4. Swept-Frequency Laser Rangefinder (See FIG. 14):

An issue with respect to the stepped-frequency system above exists when multiple targets are present with significant reflections. The issue compares the stepped-frequency system and the ability to distinguish between targets or determine that multiple targets are present. Accordingly, another embodiment of the invention is the swept-frequency rangefinder.

This system transmits an amplitude-modulated laser beam 1440, where the modulation frequency itself ramps linearly in frequency (In this embodiment, the ramp being produced by ramp generator 1450 and provided to frequency oscillator 1460 for supplying the mixer 1405 and laser driver 1330). Because the reflected wave is delayed by an amount depending on the distance to the reflection, the beat frequency produced at the mixer 1405 output 1410 depends on the distance 1420 to the reflector 1430. The bandpass filter 1440 selects the range of beat frequencies corresponding to the range of distances the system must measure, and the entire beat-frequency waveform is digitized (A/D converter 1470) and processed (via CPU 1480) to determine the frequency content. The frequency spectrum of the bandpass filter output 1445 is a direct map of the reflectivity as a function of distance 1420. In other words, the frequency transmitted is different than the frequency received back by the Base unit. This results in a beat note which has a relationship to the distance transmitted. The bandpass filter filters out beat notes that are not within the desired distance range in order to determine the distance to the target.

This swept-frequency rangefinder has the advantage of continuously measuring all distances simultaneously, which allows the CPU to determine whether there is a single strong reflection which represents the target.

Figure 15:
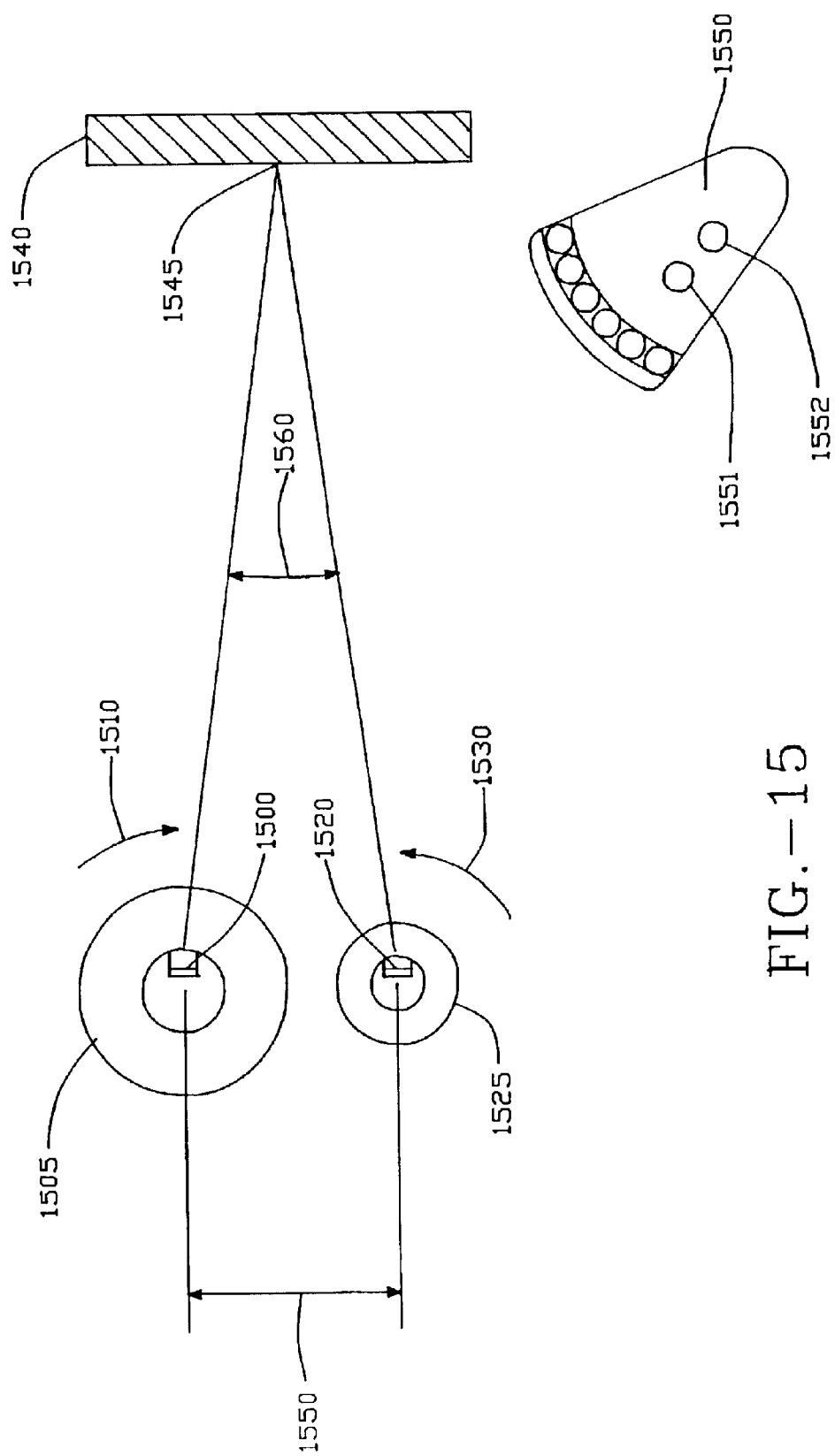
FIG. 15 is a schematic representation of a range finder using two co-planar lasers.

5. Distance Measurement Using Two Co-Planar Lasers (See FIG. 15):

A geometric technique for measuring distance can include two co-planar lasers (1500 and 1520) can be positioned, at the target, by a remote control that can independently address two rotational mechanisms (1505 and 1525). The invention works as follows.

The main laser 1500, used primarily for leveling and operating on a coded radio frequency (code 1, activated by pressing button 1551, for example) in the main unit (laser 1500 and rotational mechanism 1505) is first positioned on a target 1540 with the remote control (rotating laser 1500 in direction 1510, for example) in the same manner as the existing leveling system of the above patent. A secondary laser 1520 is mounted on a similar rotational mechanism 1525, co-planar with laser 1500, and separated from laser 1500 at a calibrated distance 1550, is then guided by the user (rotating laser 1520 in direction 1530, for example) to converge with the spot of the first laser on target 1540, resulting in converged laser dots at point 1545. To do this, the remote control must first be switched to a second coded radio frequency (code 2, activated by pressing button 1552, for example) in order to address the second rotation mechanism 1525. An angular displacement sensor, similar to those described above (not shown) then measures the angle between the two lasers and calculates the distance to the target. The distance to the target can be displayed on the main unit or the data can be transmitted to the hand controller by modulating the laser in the manner previously described.

An accurate measurement can require the user to be at the target. Therefore, for a single user system, the remote control is used for laser pointing.

INDUSTRIAL APPLICABILITY

The present invention is directed to improving the determination of the rotational position of the laser of the system relative to the base and to determine the distance from the laser leveling system to a target.

Other aspects, embodiments, and objects for the invention can be observed from a review of the figures and the attached claims. It is to be understood that other embodiments can be developed and be within the spirit and scope of the invention as claimed.

We claim:

1. A leveling system comprising:

a base;

a laser leveling device having a laser, the leveling device mounted on said base such that said laser leveling device can rotate relative to said base and including a device that can divert part of an output of the laser;

an encoder mounted to one of said base and said laser leveling device, the encoder being illuminated by said part of the output of the laser; and a sensor mounted to the other of said base and said laser leveling device, with the sensor sensing the position of the laser leveling device relative to said base.

2. The system of claim 1 wherein:

said encoder includes a plurality of encoding teeth which are shaped as one of a sine-wave pattern and a sawtooth pattern.

3. The system of claim 1 wherein:

an azimuthal error sensor mounted on said laser leveling device.

4. The system of claim 1 wherein:

the encoder includes one of a bar code and a film which absorbs variable amounts of light passing through it.

5. The system of claim 1 wherein:

said encoder and sensor are one of optical and magnetic.

6. The system of claim 1 wherein:

and a modulator that can modulate light from the laser in order to transmit data.

7. A leveling system comprising:

a base;

a laser leveling device mounted on said base such that said laser leveling device can rotate relative to said base;

an encoder mounted to one of said base and said laser leveling device; and a sensor mounted to the other of said base and said laser leveling device, with the sensor sensing a position of the laser leveling device relative to said base, wherein said laser leveling device has a laser and a device that can divert part of an output of the laser in order to illuminate the encoder.

8. An apparatus comprising:

a base unit; and a laser leveling device mounted on said base unit to rotate relative to said base unit, wherein said base unit includes:

an encoder having at least one light source and at least one sensor, and a base unit housing including an encoder ring between said at least one light source and said at least one sensor and wherein said laser leveling device includes a laser and a device adapted to divert at least a portion of an output of said laser to illuminate said encoder.

9. An apparatus according to claim 8, wherein said at least one sensor includes a first photodiode and a second photodiode.

10. An apparatus according to claim 9, wherein:

said base unit includes a base circuit board mounted within said base unit to rotate, and said first photodiode and said second photodiode are mounted to said base unit.

11. An apparatus according to claim 10, wherein said base circuit board is adapted to rotate in a path differing in phase by 90 degrees of a tooth spacing on said encoder ring.

12. An apparatus according to claim 9, wherein said base unit includes:

an opto-interrupter aperture between said at least one light source and said at least one sensor.

13. An apparatus according to claim 9, wherein said base unit includes:

a first amplifier having an input coupled to an output of said first photodiode;

a second amplifier having an input coupled to an output of said second photodiode; and an analog to digital converter having a first input coupled to an output of said first amplifier and a second input coupled to an output of said second amplifier.

14. An apparatus according to claim 13, wherein said base unit includes:

a processing engine coupled to an output of said analog to digital converter, wherein said processing engine is adapted to convert signals from said analog to digital converter into position estimates, wherein said position estimates identify positions of said encoder relative to said base housing.

15. An apparatus according to claim 14, wherein said encoder ring includes teeth forming a sine wave pattern.

16. An apparatus according to claim 14, wherein said encoder ring includes teeth forming a sawtooth pattern.

17. An apparatus according to claim 14, wherein:

said base unit includes a photosensor.

18. An apparatus according to claim 17, wherein:

an output of said photosensor is coupled to said processing engine, and said processing engine is adapted to compute a corrected angle to account for azimuthal error between said output of said laser and said base unit, based at least in part on a signal from said output of said photosensor.

19. An apparatus according to claim 8, wherein said encoder ring is a film, wherein said film is adapted to absorb a variable amount of light passing through said film.

20. An apparatus according to claim 19, wherein a sawtooth pattern exists in a density of said film.

21. An apparatus according to claim 19, wherein a sine wave pattern exists in a density of said film.

22. An apparatus according to claim 8, wherein said laser leveling device includes:

a laser;

a driver coupled to an input of said laser; and a modulator coupled to said driver.

23. An apparatus according to claim 22, wherein said laser leveling device is adapted to supply data on an output beam from said laser by modulating current from said driver to said laser.

24. An apparatus according to claim 23, wherein said laser leveling device includes a pendulum and said laser is mounted on said pendulum.

25. An apparatus comprising:

a base unit; and a laser leveling device mounted on said base unit to rotate relative to said base unit, wherein said laser leveling device includes a laser and a device adapted to divert at least a portion of an output of said laser toward said base unit, and wherein said base unit includes a base unit housing including an encoder ring in a path of said at least said portion of said output of said laser diverted by said device.

26. An apparatus according to claim 25, wherein:

said encoder ring is retro-reflective, said laser leveling device includes a photodetector in said laser, and said encoder ring is adapted to reflect said at least said portion of said output of said laser diverted by said device onto said device for reflection onto said photodetector.

27. An apparatus according to claim 25, wherein:

said base unit includes at least one sensor, and said encoder ring passes between said device and said at least one sensor.

28. An apparatus according to claim 25, wherein said encoder ring includes teeth forming a sine wave pattern.

29. An apparatus according to claim 25, wherein said encoder ring includes teeth forming a sawtooth pattern.

* * * * *